Jan. 1, 1963

D. M. MacMILLIN 3,071,039

AUTOMATIC EXPOSURE CONTROL WITH AN
INTERMITTENT NEEDLE ENTRAPMENT

Filed Feb. 9, 1959

Inventor:
David M. MacMillin
By
Hill, Sherman, Meroni, Gross & Simpson Atty.

Jan. 1, 1963 D. M. MacMILLIN 3,071,039
AUTOMATIC EXPOSURE CONTROL WITH AN
INTERMITTENT NEEDLE ENTRAPMENT
Filed Feb. 9, 1959 4 Sheets-Sheet 3

Inventor:
David M. MacMillin
By
Hill, Sherman, Meroni, Gross & Simpson Atty.

United States Patent Office 3,071,039
Patented Jan. 1, 1963

3,071,039
AUTOMATIC EXPOSURE CONTROL WITH AN INTERMITTENT NEEDLE ENTRAPMENT
David M. MacMillin, Wilmette, Ill., assignor to Bell & Howell Company, Chicago, Ill., a corporation of Illinois
Filed Feb. 9, 1959, Ser. No. 792,203
11 Claims. (Cl. 88—16)

This invention relates to apparatus for adjusting the exposure of a photographic camera to provide proper exposure of the film therein under different light conditions, and has for its general object the provision of a new and improved apparatus of this character.

More particularly this invention is directed to an improved apparatus for automatically varying the area of the diaphragm opening within a motion picture camera as a function of the available light about the camera.

Heretofore, many and varied means have been devised for controlling the size of the diaphragm opening for selectively restricting and enlarging the cross-sectional area of the light passage intermediate the light receiving aperture in the camera and the film to be exposed. Such means generally comprise a plurality of iris members which are selectively movable to restrict or enlarge the diaphragm opening and which may be automatically or manually adjusted. Generally, such automatic control systems comprise a photoelectric cell, a galvanometer electrically connected to the photoelectric cell, a rotary meter coil associated with the galvanometer and rotatable as a function of the electrical energy derived from the photoelectric cell, and some form of gear means interconnecting the rotatable meter coil with the iris members to move the iris members to thereby vary the area of the diaphragm opening as a function of the intensity of light impinging on the photoelectric cell.

Since automatic exposure control mechanisms of the type described above generally comprise a plurality of interconnected rotary members, it has generally been found advantageous, if not necessary, to both statically and inertially balance the control system to render the system substantially insensitive to movements of the photographic camera itself. Obviously, however, both inertially and statically balancing the rotative members in a diaphragm opening control mechanism is a relatively difficult task necessitating the formation of the various movable members therein within relatively close tolerances and the expenditure of a considerable amount of labor.

In view of the foregoing and in order to obviate the disadvantageous characteristics of such automatically operable diaphragm opening control mechanisms, applicant hereinafter sets forth with particularity an automatically operable diaphragm opening control mechanism which need not be inertially balanced and which may be relatively economically produced but which, nonetheless, is effective to render the cooperating iris members defining the diaphragm opening relatively insensitive to movements of the photographic camera itself.

Applicant's diaphragm opening control mechanism comprises generally a pair of elongated iris members which are disposed in overlapping relationship with respect to one another and which are moved longitudinally to vary the area of the diaphragm opening defined thereby by a drive gear which is cooperable therewith. The drive gear is, as will hereinafter become more fully apparent, indirectly driven through a plurality of gears and shafts which are, in turn, moved into and out of driving engagement with an output power gear associated with a friction clutch as a function of the position of a meter coil associated with a galvanometer. The galvanometer is, in turn, electrically energized by a photoelectric cell so that the iris members are thereby rendered sensitive to the intensity of light impinging on the photoelectric cell.

An important feature of the present invention is that the gear drive mechanism, associated with the iris members to move same, is arranged to controllably move the iris member drive gear in either of two opposite rotational directions to thereby move the iris members to both the aperture open and aperture closed positions so that, unlike the normal practice in the photographic art, the iris members are positively driven in both directions and are not merely spring biased in one direction.

Accordingly, it is a principal object of the present invention to provide an improved means for adjusting the diaphragm opening in a photographic camera.

Another object of the present invention is to provide an improved means for adjusting the diaphragm opening in a photographic camera which is substantially insensitive to movements of the camera itself but which need not be inertially balanced.

A further object of the invention resides in the provision of a novel gear drive mechanism for rotating an iris member drive gear to effect axial movement of a pair of elongated iris members to thereby regulate the area of the diaphragm opening defined by the cooperating iris members as a function of the intensity of light to which the camera is subjected.

These and other objects of the invention will become apparent from time to time as the following specification proceeds and with reference to the accompanying drawings, wherein.

Figures 7, 8, 9:
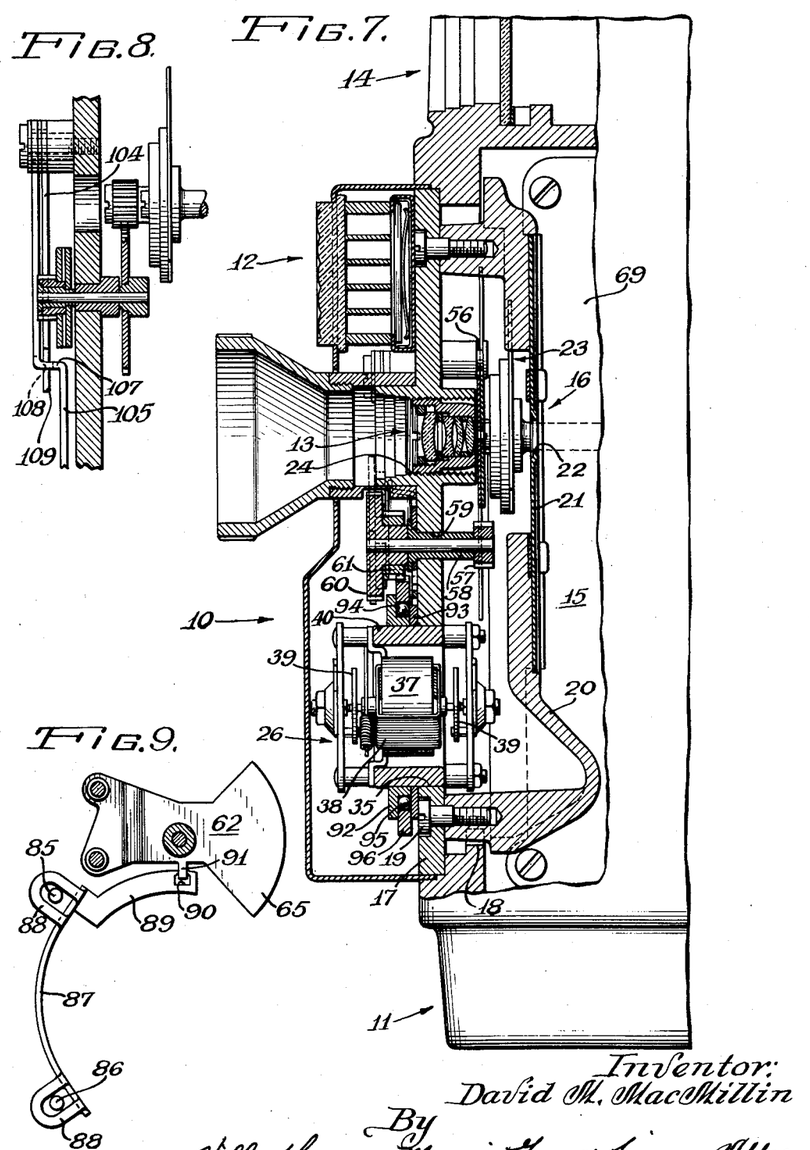
FIGURE 7 is a fragmental vertical sectional view through the camera illustrated in the drawings which is taken along lines VII—VII of FIGURE 4.
FIGURE 8 is still another fragmental vertical sectional view of the camera illustrated in the drawings which is taken along lines VIII—VIII of FIGURE 4.
FIGURE 9 is a front elevational view of a pair of cooperating control elements which are disposed in the diaphragm opening control mechanism in a manner which will hereinafter be described more fully in detail but which are here illustrated with their cooperating parts removed for the sake of clarity.

Referring now particularly to FIGURE 7 there is shown a motion picture camera 10, which per se is of standard design and which includes generally a casing 11 having a photoelectric eye 12, a lens 13, and a view finder 14 associated therewith. The casing 11 serves to enclose the mechanism of the camera and provides a film chamber 15 therein within which are arranged two spaced rotatable film spools (not shown) and a vertical exposure guide 16 arranged at the front portion of the film chamber 15.

The front wall 17 of the camera casing 11 comprises a separate part detachably secured in a shouldered opening 18 in the front of the main casing 11 by headed screws 19 screw-threaded rearwardly into a frame part 20 fixed within the main casing portion 11.

The exposure guide 16 comprises a front guide plate 21 which is secured within the casing on the frame part 20 in rearwardly spaced relation from the front wall 17. Film is guided against the rear face of the guide plate 21 and the guide plate is provided with a forwardly facing horizontally elongated rectangular exposure aperture 22, conforming with a standard motion picture frame through which successive frames of the film are exposed as the film is intermittently fed through the exposure guide. It will further be noted that a rotary shutter 23 is positioned immediately in front of the guide plate and is rotated in timed relation with the intermittent feed of the film to cover the exposure aperture 22 during the film feed intervals as is usual.

The front wall 17 is also provided with a lens opening 24, with which the exposure aperture 22 is aligned, and a suitable photographic lens 13 is mounted on the front wall within the lens opening 24, and in alignment with the exposure aperture 22, for forming images on the film at the exposure aperture.

Figure 1:
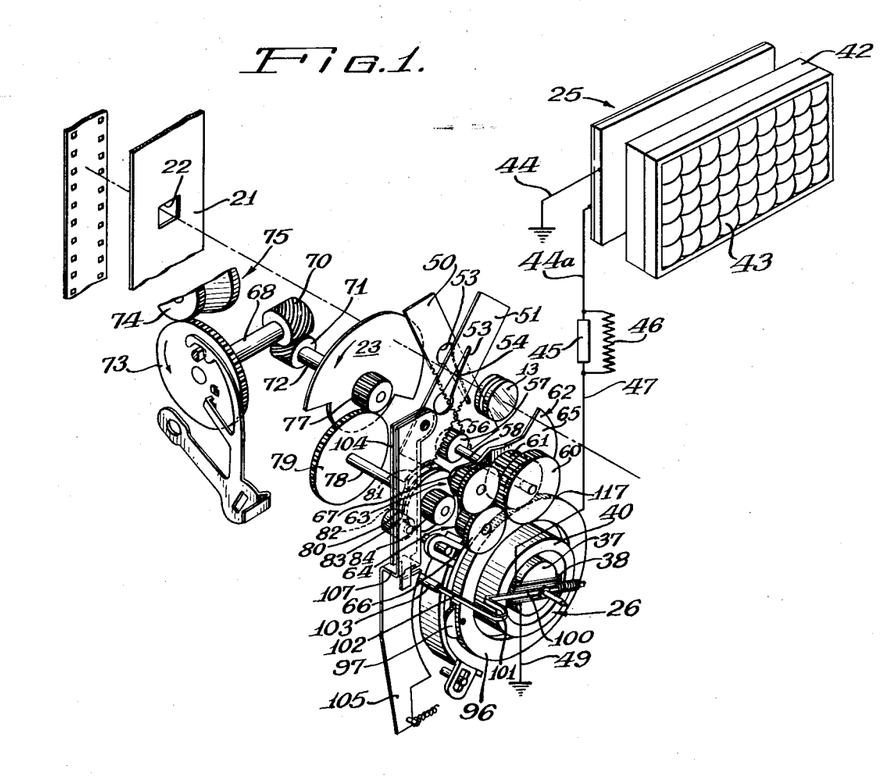
FIGURE 1 is an exploded pictorial view of the exposure control mechanism of the present invention together with parts of the camera related thereto and including the circuit diagram of the control.

As shown in the diagrammatic representation of the diaphragm opening control mechanism of the present invention illustrated in FIGURE 1, a photoelectric cell 25 is electrically connected with a galvanometer 26 which is, in turn, associated with the mechanical linkage of the diaphragm opening control mechanism, forming the subject of the present invention, for controlling the operation of same.

The galvanometer 26 is suitably positioned within an aperture 35 in the front wall 17 in a manner which is well known in the art and is of usual construction, comprising a central cylindrical permanent magnet 37, a pivoted rectangular circuit coil 38 surrounding the magnet 37 and spring biased to a zero position by spiral springs 39, and a ring 40 of magnetic material surrounding the coil and serving to concentrate the magnetic field of the magnet. The galvanometer is so positioned that the pivotal axis of the coil is normal to the plane of the exposure aperture 22.

The forwardly facing photoelectric cell 25 is mounted at the front of the camera 10 on the front wall 17 above the lens 13 and has the usual light controlling baffle 42 disposed in front of the cell and the usual reticular lens 43 secured in front of the baffle by suitable securing means. The circuit coil of the galvanometer is connected in circuit with the photoelectric cell 25 so that the coil is deflected from its spring biased zero position by current derived from the photoelectric cell in proportion to the intensity of light impinging on the photoelectric cell. The photoelectric cell is connected, as designated at 44, to the metal framework of the camera, which framework is for convenience referred to as "ground," and the other terminal of the cell is connected by a conductor 44a to one terminal of a resistor 45 and with a resistor 46, which is connected in shunt with the resistor 45. The other terminals of these resistors are connected by a conductor 47 to one terminal of the circuit coil 38 of the galvanometer 26, and the terminal of this coil is connected to ground as designated at 49.

The purpose of the resistors 45 and 46 is to compensate for the positive temperature coefficient of resistance of the photoelectric cell and the galvanometer circuit per se so that the deflection of the circuit coil 38 is approximately uniform through the range of temperature normally encountered in use, as from zero to 100° F. For this purpose, the resistor 45, commercially known as a thermistor, has a negative temperature coefficient of resistance greater than the positive temperature coefficient of resistance of the photoelectric cell and galvanometer circuit per se, and the resistor 46, serving as a modifying resistor, has a temperature coefficient of resistance lying between the positive temperature coefficient of resistance of the photoelectric cell and galvanometer circuit per se and the negative temperature coefficient of resistance of the thermistor 45, the characteristics of these resistances being specifically selected to obtain the aforesaid compensation.

Referring most particularly to FIGURES 1-4, a pair of elongated iris members or masking members 50 and 51 are positioned within the camera body. The members are disposed in overlapping relationship with one another which have tear-drop or tapered diaphragm openings 53 formed therein and are cooperable to define a diaphragm opening 54. As shown most clearly in FIGURES 4 and 7, three guide pins 55 are triangularly secured to the rear face of front wall 17 and are grooved as at 56 to slidably receive and guide the iris members 50 and 51 for axial movement.

Each of the iris blades have a plurality of gear teeth 56 formed along the inner longitudinal edge thereof which are cooperable with and disposed in driving engagement with a plurality of peripheral gear teeth on a gear wheel 57. The gear wheel 57 is, in turn, mounted on and formed integrally with a forwardly extending gear shaft 58 which is journaled in a suitable receiving aperture 59 in the front wall 17 and which has a radially enlarged gear 60 and a radially reduced gear 61 mounted on the forward free end thereof.

A plate 62 is pivotally mounted on the shaft 58 intermediate the front wall 17 and the front cover of the camera 10 and has a pair of gear heads 63 and 64 rotatably mounted on one end thereof about pivot pins secured to the plate 62 and has an enlarged boot 65 formed on the opposite end thereof to offset the weight of the gear heads 63 and 64. The gear heads 63 and 64 each comprise large and small diameter gears 66 and 67, respectively, and are so positioned on the plate 62 that the large diameter gears 66 are positioned in driving engagement with one another.

A rotary power shaft 68 is disposed within the camera and has its ends journaled in a pair of spaced side plates 69 which are disposed within the camera on opposite sides of the film chamber 15 in parallel relation with one another. The power shaft 68 has a helical gear 70 disposed on one end thereof which is positioned in driving engagement with a mating helical gear 71 affixed to the inner end portion of a second power shaft 72 to transmit rotary motion from the shaft 68 to the shaft 72. It will suffice to state that the power shaft 68 is rotatably driven by means of a plurality of interconnected gears from a spring wound power source in a manner which is well known in the art. A large diameter spur gear 73 is affixed to the opposite end of the power shaft 68 from the helical gear 70 and is disposed in engagement with a suitable mating gear 74 associated with a governor 75 to prevent rotational acceleration of the power shaft 68 when it is being driven by the spring wound power source (not shown).

The rotary shutter 23 and a gear head 77 are affixed to the shaft 72 on the opposite end thereof from the helical gear 71 for corotatable movement with respect thereto and on the opposite side of the frame part 20, within which the shaft 72 is journaled, from the helical gear 71. A cam shaft 78 is journaled within the front wall 17 (see FIGURE 5) and has a large diameter gear 79 mounted on the inner end thereof which is disposed in driving engagement with the gear head 77 and which is driven by same. A cam 80 having a cam lobe 81 formed along one edge thereof is disposed on the outer free end of the cam shaft 78 for reasons which will hereinafter become more fully apparent and comprises, in conjunction with a disk 82 which is also mounted on the shaft 78, a friction clutch 83.

A peripherally toothed gear head 84 is slidably mounted on the cam shaft 78 and is affixed to the output disk 82 of the friction clutch 83 to transmit rotary motion from the friction clutch 83 to the gear heads 63 and 64. It will be noted that the gear head 84 is arranged to be drivingly engaged with the radially reduced gears 67 forming a part of gear heads 63 and 64 but that when the pivoted plate 62 is in the position illustrated in FIGURE 2, neither of the radially reduced gears 67 are disposed in engagement with the gear head 84 so that no power is transmitted from the gear head 84 to the gear heads 63 or 64.

Figure 3:
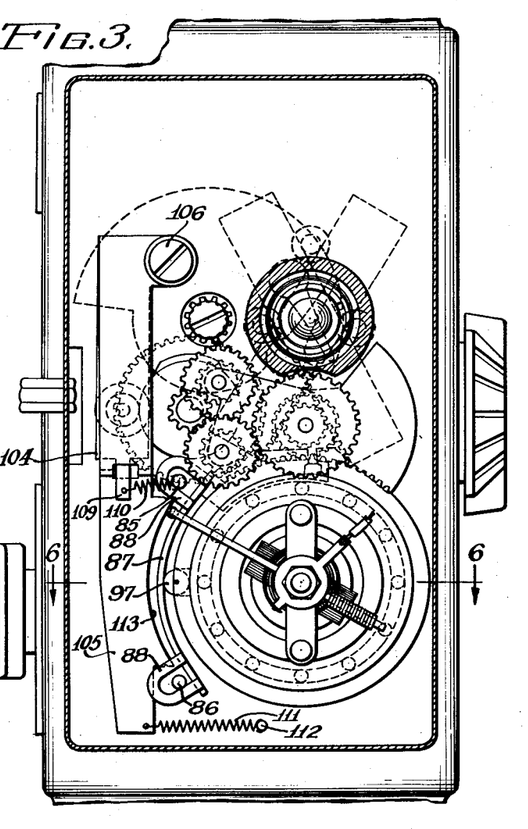
FIGURE 3 is a fragmental front elevational view which is similar in nature to FIGURE 2 but which shows the iris members and various control elements associated therewith in a different operating position.

When, however, the pivoted plate 62 has been angularly moved about the shaft 58 to the position illustrated in FIGURE 3, the radially reduced gear 67 forming a part of the gear head 63 is moved into engagement with the gear head 84 so that rotary motion is imparted thereto from the gear head 84. It will be understood that when the camera is in operation the cam shaft 78 constantly rotates due to the driving engagement between the gear 79 and the gear head 77. The friction clutch 83 is interposed between the cam shaft 78 and the gear head 84 so that when the pivoted plate 62 has been angularly moved to position one of the radially reduced gears 67 in engagement with the gear head 84, rotary motion will be transmitted from the gear head 84 to one of the gear heads 63 or 64 but the impact shock created when one of the gear heads 63 or 64 strikes the gear head 84, will be dissipated by slippage in the clutch so that rotary motion will be transmitted from the gear head 84 to one of the gear heads 63 or 64 at only a limited, safe, torque.

The radially enlarged gears 66 forming portions of the gear heads 63 and 64 are positioned so that they are constantly in driving engagement with one another and so that the gear 66 on gear head 64 drivingly engages the gear 60 mounted on shaft 58.

Thus, if it be assumed that the shaft 68, as viewed in FIGURE 1, is rotatably driven in a counter-clockwise direction, the shaft 72 will be similarly rotated in a counterclockwise direction to thereby impart clockwise rotational movement to the cam shaft 78. Accordingly, when the gear heads 63 and 64 are out of engagement with the gear head 84 the gear head 84 will constantly rotate in a clockwise direction as viewed in FIGURES 1–4 as long as the camera is running. Assuming, for illustrative purposes, that the iris members 50 and 51 are initially in the position illustrated in FIGURE 2 counter-clockwise pivotal movement of the plate 62 about the shaft 58 will move the radially reduced gear 67 of the gear head 63 into engagement with the gear head 84 to thereby impart counter-clockwise rotational movement to the gear head 63 and consequent clockwise rotatable movement to the gear head 64. The gear head 60, shaft 58, and gear head 57 will consequently be moved rotatably in a counter-clockwise direction due to the driving engagement between the gear head 60 and the gear head 64 so that the iris members 50 and 51 will be axially moved from the position illustrated in FIGURE 2 toward the position illustrated in FIGURE 3. It will here be noted that the aperture 53 in the iris member 50 is tapered from top to bottom and that the aperture 53 in the iris member 51 is tapered from bottom to top so that when the iris members 50 and 51 are in the position illustrated in FIGURE 2, a maximum area diaphragm opening 54 is defined by the cooperating apertures 53. As a result, counter-clockwise rotatable movement of the gear head 57 tends to decrease the area of the diaphragm opening.

A pair of guide pins 85 and 86 are affixed to the front wall 17 of the camera 10 and serve as guides for a mechanical transducer 87 which is floatingly mounted within the camera and which has a pair of U-shaped brackets 88 formed integrally therewith which extend about the pins 85 and 86. As shown most clearly in FIGURE 9, an arm 89 is formed integrally with and extends from the mechanical transducer 87 and has a notch 90 formed in the outer end thereof within which a depending leg 91 formed integrally with the pivoted plate 62 is tiltably secured.

Referring now more particularly to FIGURE 7, it will be noted that a circular bracket 92 is suitably secured to the magnetic ring 40 of the galvanometer 26 and that the bracket is L-shaped in cross-section and forms, in conjunction with a bearing plate 93 secured to the front wall 17, a channel 94 for a plurality of ball bearings 95. A compensating ring 96 slidably fits within the channel 94 intermediate the bracket 92 and the bearing plate 93 and rides on the bearings 95.

Figure 2:
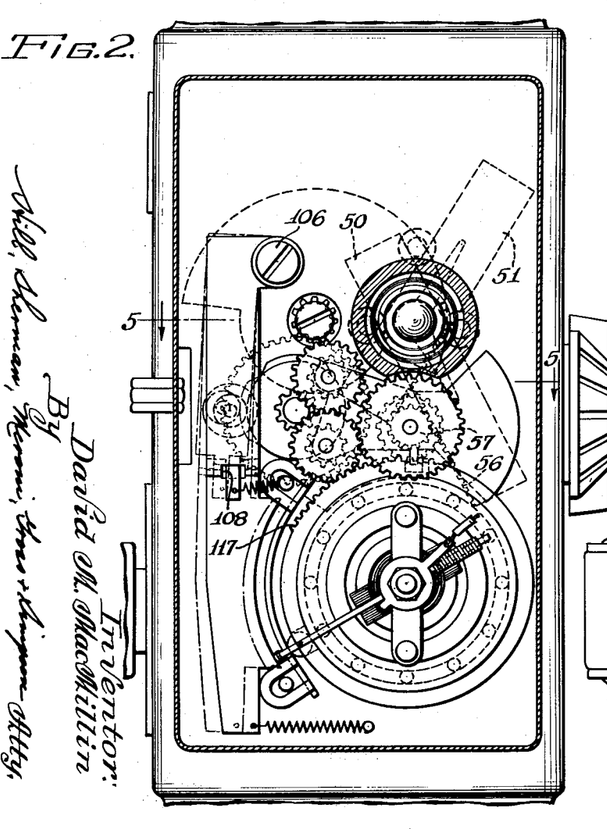
FIGURE 2 is a fragmental front elevational view of the diaphragm opening control mechanism constructed in accordance with the principles of the present invention showing the front face of the camera removed.
Figure 4:
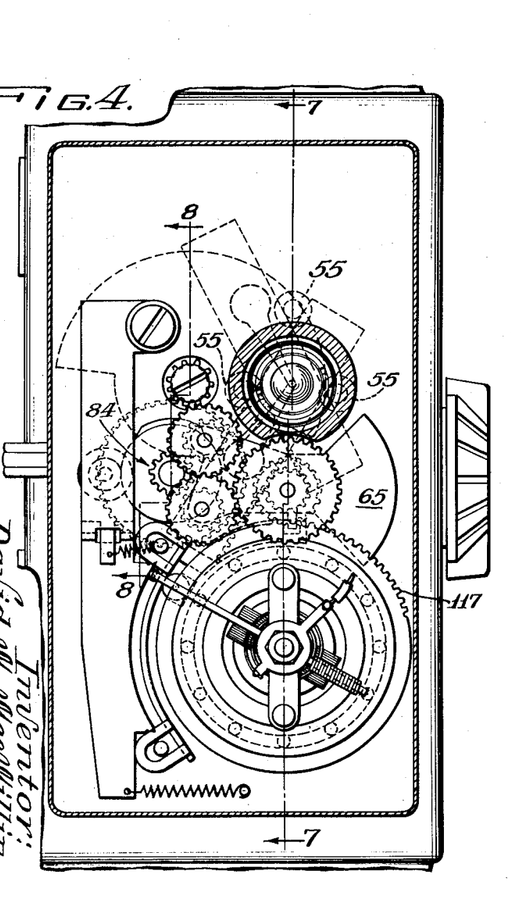
FIGURE 4 is still another fragmental front elevational view which is similar in nature to FIGURES 2 and 3 but which shows the various control elements of the diaphragm opening control mechanism including the cooperating iris members in yet another position.

As shown most clearly in FIGURES 2–4, the compensating ring 96 has a fulcrum member 97 affixed thereto which is engageable with the mechanical transducer 87 and which provides a fulcrum, about which the mechanical transducer 87 can pivot.

With particular reference now to FIGURES 3 and 9, it will be noted that the depending leg 91 formed integrally with the plate 62 is formed adjacent the pivotal axis of the plate 62 so that when the arm 89 of the mechanical transducer 87 is moved toward the right, the plate 62 will be pivoted in a counter-clockwise direction about the shaft 58 and so that clockwise pivotal movement of the plate 62 will be effected when the arm 89 of the mechanical transducer 87 moves toward the left. Thus, if pressure is applied to the outer convex surface of the mechanical transducer 87 at a point above the point of abutment of the fulcrum 97 with the transducer 87 the arm 89 will be moved toward the right and the plate 62 will consequently be angularly moved in a counter-clockwise direction about its pivotal axis. Conversely, upon the application of pressure to the convex surface of the mechanical transducer 87 at a point below the point of coaction of the fulcrum 97 with the transducer 87, the arm 89 will be moved toward the left to impart clockwise angular movement to the plate 62 about the shaft 58.

An entrapment needle 100 is affixed to the rotary rectangular circuit coil 38 for corotatable movement therewith and has a bowed portion 101 formed integrally therewith which is disposed intermediate the main stem portion affixed to the rotary meter coil 38 and a depending leg 102 that has a sleeve 103 affixed thereon which, in turn, is disposed in juxtaposition to the convex surface of the mechanical transducer 87.

A power transmission lever and an entrapment lever 104 and 105, respectively, are substantially L-shaped in side elevation and are pivotally mounted on the front wall 17 of the camera 10 by means of a pivot pin 106 extending through what may be designated as the base of the L and which is screw-threaded into the front wall 17. The entrapment lever 105, as shown most clearly in FIGURES 1 and 8, has a shoulder 107 formed therein intermediate the ends thereof which is apertured as at 108. The power transmission lever 104 has a tongue 109 formed on the lower end thereof which is adapted to fit through the aperture 108 so that pivotal movement of the power transmission lever 104 will act to pivotally move the entrapment lever 105. A spring 110 interconnects the tongue 109 and the guide pin 85 to urge the power transmission lever 104 in a counter-clockwise direction and that a spring member 111 is connected at one end to the entrapment lever 105 and, at the other end thereof, to a pin 112 which is suitably mounted on the front wall 17 to similarly urge the entrapment lever 105 in a counter-clockwise direction about the pin 106.

It will be noted that the entrapment lever 105 has a concave surface formed along one edge thereof which is cooperable with the mechanical transducer 87 and which is of substantially similar configuration as the convex surface of the mechanical transducer 87. Regardless of the rotated position of the mechanical transducer 100, the sleeve 103 fixed to the depending leg 102 of entrapment needle 100 will constantly be interposed between the concave surface 113 of the lever 105 and the convex surface of the mechanical transducer 87.

Figure 5:
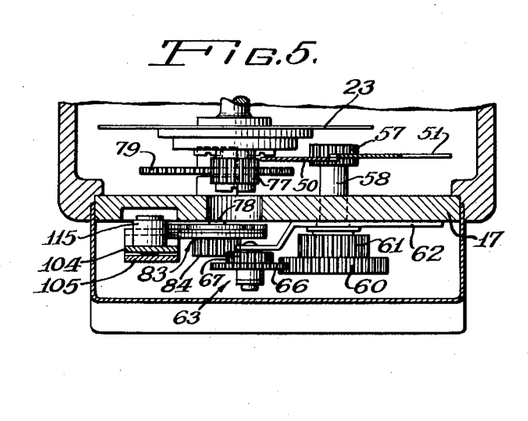
FIGURE 5 is a fragmental horizontal sectional view through the camera illustrated in FIGURE 2 which is taken along lines V—V of FIGURE 2.
Figure 6:
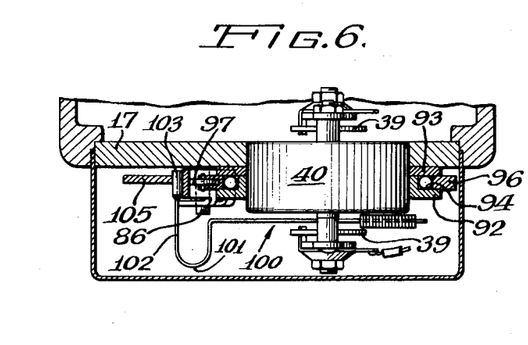
FIGURE 6 is another fragmental horizontal sectional view taken through the camera illustrated in FIGURE 2 and which is taken along lines VI—VI of FIGURE 2 but which shows the entrapment needle and meter coil in a different position from that shown in FIGURE 2.

As viewed most clearly in FIGURE 5, an abutment member or cam follower 115 is secured to the power transmission member 104 and extends rearwardly therefrom and is maintained in engagement with the cam wheel 80 by means of the tension spring 110. As viewed in FIGURE 2, when the cam wheel 80 rotates to the broken line position illustrated therein the cam lobe 81 will move into engagement with the cam follower 115 to move the cam follower and consequently the power transmission lever 104 connected therewith outwardly away from the center axis of the cam wheel 80 against the opposing biasing force of the spring member 110. The depending tongue 109 of the power transmission lever 104 will then act against the wall portion of the entrapment lever 105 defining the aperture 108 to pivotally move the entrapment lever 105 about the pin 106 in a clockwise direction against the opposing biasing force of the spring members 110 and 111.

It will be noted that the aperture 108 has been formed of considerably greater width than the depending tongue 109 so that a certain amount of lost motion may be incorporated in the lever system to reduce objectionable operating noise therein. It is desirable that the lever 105 be moved rapidly from the full line to the broken line position illustrated in FIGURE 2 for reasons which will hereinafter become apparent but if the abutment member or cam follower 115 were secured to the entrapment lever 105, the noise produced when the cam lobe 81 strikes the follower 115 might be objectionable. In order to reduce this objectionable noise, a relatively long cam slope leading from the circumference of the cam wheel 80 to the high point of the cam lobe 81 might be formed so that little if any noise would result when the cam lobe 81 strikes the cam follower 115. The entrapment lever 105 would, nonetheless, be rapidly moved from the full line to the broken line position illustrated in FIGURE 2 upon engagement of the depending tongue 109 with the lever 105 to move the levers in a clockwise direction about the pin 106 against the opposing biasing force of spring members 110 and 111.

In view of the foregoing and in light of the fact that the shaft 78 rotates constantly when the camera is running, it will be understood that the cam wheel 80 will constantly rotate to pivotally move the power transmission lever 104 and the entrapment lever 105 in a clockwise direction about the pivot pin 106 against the opposing biasing force of spring members 110 and 111 and that when the cam follower 115 has moved off the cam lobe 81 the follower, and consequently the levers 104 and 105 will be returned substantially to the position illustrated in FIGURE 3 by spring 110 and 111.

Assuming that the controlling iris members 50 and 51 are in the maximum diaphragm open position illustrated in FIGURE 2 and that the entrapment needle 100 is disposed in the position illustrated in FIGURE 3, due to the electrical energy transmitted from the light sensitive photoelectric cell 25 to the galvanometer 26, the entrapment lever 105 upon movement from the position illustrated in broken lines in FIGURE 2 to the position illustrated in full lines therein, will act against the mechanical transducer 87 to pivot the transducer in a clockwise direction about the fulcrum 97 to thereby pivotally move the plate 62 in a counter-clockwise direction about the shaft 58 so as to move the diametrically reduced gear head 67 into engagement with the peripheral teeth on gear head 84. The gear head 84 rotates, as has hereinbefore previously been noted, in a clockwise direction so that the gear head 57 will be rotated in a counter-clockwise direction through the train of gears 84, 63, 64, and 60 to axially move the iris members 50 and 51 toward the position illustrated in FIGURE 3 to decrease the size of the diaphragm opening as a function of the intensity of light impinging on the photoelectric cell 25.

It will be apparent from the foregoing that if no means were provided for compensating for the movement of the iris members, they would continue to move until their cooperating apertures defined the smallest possible diaphragm opening. In order to obviate this disadvantageous feature, the compensating ring 96 which carries the fulcrum member 97 is automatically rotated as a function of the movement of the iris members. To this end the compensating ring 96 has a gear rack 117 formed about a portion of the periphery thereof which is cooperable with and driven by the gear head 61. Thus, when shaft 58, and consequently the gear head 61, rotate in a counter-clockwise direction the compensating ring 96 will be rotated in a clockwise direction to vary the position of the fulcrum member 97 and thereby vary the effective length of the lever arm of the mechanical transducer 87.

Assuming once again that the camera is running and that the shaft 68 is rotating at a constant angular velocity and further that the light impinging on the photoelectric cell 25 is initially of low intensity, the operation of the diaphragm opening control mechanism and its associated components will be substantially as follows: The rotary shutter 23 will be rotated at a constant speed through interconnection with gear heads 70 and 71 and shaft 72 to periodically cover and uncover the exposure aperture 22 during successive film feed intervals as is well known in the art. The shaft 72 and the rotary shutter 23 mounted thereon will be rotated in a counter-clockwise direction to effect clockwise rotational movement of the gear wheel 79 due to the coaction between the gear wheel 79 and gear head 77 mounted on the shaft 72. The shaft 78 interconnecting the gear wheel 79 and the cam wheel 80 will act to rotatably move the cam wheel 80 in a clockwise direction to thereby also rotatably move the disk 82 and the gear head 84 in a clockwise direction. It will be understood that when the cam follower 115 is in engagement with the major circumference of the cam wheel 80, as distinct from the cam lobe 81, the entrapment lever 105 will be urged into engagement with the sleeve 103 affixed to the entrapment needle 100 to entrap the needle between the concave edge of the lever 105 and the convex surface of the mechanical transducer 87.

Upon rotation of the cam lobe 81 to the position illustrated in broken lines in FIGURE 2, the power transmission lever 104 and subsequently the entrapment lever 105 will be pivotally moved in a clockwise direction about the pin 106 to thereby disengage the lever 105 from the sleeve 103 encircling the depending leg 102 of the entrapment needle 100 and to thereby permit the entrapment needle 100 to move freely in accordance with the amount of electrical energy transmitted to the galvanometer 26 from the photoelectric cell 25. As the intensity of light impinging on the photoelectric cell 25 increases the entrapment needle 100 may, for instance, be moved to a horizontally extended position during that interval when the entrapment lever 105 is maintained out of engagement with the sleeve 103 by engagement of the cam lobe 81 with the cam follower 115. Assuming that the remaining parts of the diaphragm opening control mechanism are positioned substantially as shown in FIGURE 2, the lever 105 upon returning to the full line position illustrated in FIGURE 2 will act against the sleeve 103 affixed to the entrapment needle 100 to pivotally move the mechanical transducer 87 in a clockwise direction about the fulcrum member 97 to thereby pivotally move the plate 62 in a counter-clockwise direction thus moving the radially reduced gear 67, forming a part of gear head 63, into engagement with the rotating gear head 84. Torque will thus be transmitted to the gear head 63 to rotatably move gear head 63 in a counter-clockwise direction and to thereby effect clockwise rotatable movement of the gear head 64. Such rotatable movement of the gear head 64 will act to rotatably move the gear wheel 60, gear 61, shaft 58, and gear head 57 in a counter-clockwise direction. The counter-clockwise rotatable movement of the gear wheel 57 will act to axially move the iris members 50 and 51 from the position illustrated in FIGURE 2 toward the position illustrated in FIGURE 3. The rotating gear 61 will then simultaneously act to rotatably move the compensating ring 96 in a clockwise direction to thereby angularly move the fulcrum member 97 from the position illustrated in FIGURE 2 toward the position illustrated in FIGURE 3. It will be understood that the friction clutch 83 is so arranged that after the initial torque is transmitted from the gear head 84 to the gear head 63, input torque to the clutch 83 will be partly absorbed in slippage between disk 82 and cam 80 so that only a limited, safe torque will be transmitted to the gear head 63 to effect rotatable movement of same.

If, however, the gear train comprising gear 60, gear head 63, and gear head 64 tends to move through too great an angular displacement thereby overcompensating for the intensity of light impinging on the photoelectric cell 25, the coaction between members 105, 103, 87, and 97 will act to return the iris members to their proper position in the following manner: The fulcrum member 97 will be moved to a point above the horizontal axis of the entrapment needle 100 so that when the entrapment lever 105 subsequently engages the sleeve 103 on entrapment needle 100 the mechanical transducer 87 will be pivotally moved in a counter-clockwise direction about the fulcrum member 97 to thereby pivotally move the plate 62 in a clockwise direction about the shaft 58 and to accordingly move the diametrically reduced gear 67 forming a part of gear head 64 into engagement with the gear head 84 to reverse the procedure set forth above and to thereby axially move the iris members 50 and 51 downwardly.

It will be thus understood that applicant has provided a novel, entirely automatically operating diaphragm opening control mechanism wherein the area of the diaphragm opening is automatically varied as a function of the intensity of light impinging on a photoelectric cell and wherein the automatic diaphragm opening control mechanism need not be inertially balanced to render the mechanism substantially insensitive to movements of the camera itself.

It will therefore be understood that this embodiment of the invention has been used for illustrative purposes only and that various modifications and variations of the present invention may be effected without departing from the spirit and scope of the novel concepts thereof.

I claim as my invention:

1. In a photographic camera having a film exposing aperture and a diaphragm for controlling the amount of light reaching said aperture, the improvement of means for automatically adjusting said diaphragm in response to the light available comprising: a photoelectric cell, a galvanometer having a movable circuit coil associated therewith movable in response to variations in the electrical output of said cell, said diaphragm comprising at least one masking member operable to define a diaphragm opening, power means, motion translation means drivingly connected to said masking member, first and second power transmission means drivingly connected to said motion translation means for driving said motion translation means in opposite directions, a pivoted member connected to said power transmission means for selectively moving one of said power transmission means into driving connection with said power means to vary the area of the diaphragm defined by said masking member, and means for effecting pivotal movement of said pivoted member as a function of the position of said circuit coil.

2. In a photographic camera having a film exposing aperture and a diaphragm for controlling the amount of light reaching said aperture, the improvement of means for automatically adjusting said diaphragm in response to the light available comprising: a photoelectric cell, a galvanometer having a movable circuit coil associated therewith movable in response to variations in the electrical output of said cell, said diaphragm comprising at least one masking member operable to define a diaphragm opening, power means, a shaft drivingly connected to said masking member, a pair of rotary members connected serially with said shaft to rotatably drive said shaft, said rotary members being selectively movable into driving engagement with said power means by pivotal movement of said pivoted plate, and means for selectively drivingly connecting one of said rotary members with said power means as a function of the position of said circuit coil.

3. In a photographic camera having a film exposing aperture and diaphragm for controlling the amount of light reaching said aperture, the improvement of means for automatically adjusting said diaphragm in response to the light available comprising: a photoelectric cell, a galvanometer having a movable circuit coil associated therewith movable in response to variations in the electrical output of said cell, said diaphragm comprising at least one masking member operable to define a diaphragm opening, power means, a shaft drivingly connected to said masking member, a pivoted member, a pair of rotary members mounted on said pivoted member and serially drivingly engaging one another and said shaft to rotatably drive said shaft, said rotary members being selectively movable into driving engagement with said power means by pivotal movement of said pivoted plate, means extending from said circuit coil and movable therewith, and intermittent drive means acting through said last mentioned means for effecting pivotal movement of said pivoted member as a function of the position of said circuit coil.

4. In a photographic camera having a film exposing aperture and a diaphragm for controlling the amount of light reaching said aperture, the improvement of means for automatically adjusting said diaphragm in response to the light available comprising: a photoelectric cell, a galvanometer having a movable circuit coil associated therewith movable in response to variations in the electrical output of said cell, said diaphragm comprising at least one masking member operable to define a diaphragm opening, power means, a shaft drivingly connected to said masking member, a positionably variable pivot member, a mechanical transducer pivotally mounted on said pivot member, a pivoted plate interconnected with said mechanical transducer, a pair of rotary members mounted on said pivoted plate and serially drivingly engaging one another and said shaft to rotatably drive said shaft, said rotary members being selectively movable into driving engagement with said power means by pivotal movement of said pivoted plate, intermittent drive means for effecting pivotal movement of said mechanical transducer as a function of the position of said circuit coil, and means varying the position of said pivot member with respect to said mechanical transducer as a function of the degree of rotation of said shaft.

5. In a photographic camera having a film exposing aperture and a diaphragm for controlling the amount of light reaching said aperture, the improvement of means for automatically adjusting said diaphragm in response to the light available comprising: a photoelectric cell, a galvanometer having a movable circuit coil associated therewith movable in response to variations in the electrical output of said cell, said diaphragm comprising a plurality of masking members cooperable to define a diaphragm opening, power means, a shaft drivingly connected to said masking members, a positionably variable pivot member, a mechanical transducer pivotally mounted on said pivot member, a pivoted plate interconnected with said mechanical transducer, means extending from said circuit coil and movable therewith, a pair of rotary members mounted on said pivoted plate and serially drivingly engaging one another and said shaft to rotatably drive said shaft, said rotary members being selectively movable into driving engagement with said power means by pivotal movement of said pivoted plate, intermittent drive means acting through said extension means against said mechanical transducer for effecting pivotal movement of said mechanical transducer as a function of the position of said circuit coil, and means varying the position of said pivot member with respect to said mechanical transducer as a function of the direction and degree of rotation of said shaft.

6. In a photographic camera having a film exposing aperture and a diaphragm for controlling the amount of light reaching said aperture, the improvement of means for automatically adjusting said diaphragm in response to the light available comprising: a photoelectric cell, a galvanometer having a movable circuit coil associated therewith movable in response to variations in the electrical output of said cell, said diaphragm comprising a plurality of masking members cooperable to define a diaphragm opening, power means, a shaft drivingly connected to said masking members, a positionably variable pivot member, a mechanical transducer pivotally mounted on said pivot member, a pivoted plate interconnected with said mechanical transducer, a pair of rotary members mounted on said pivoted plate and serially drivingly engaging one another and said shaft to rotatably drive said shaft, said rotary members being selectively movable into driving engagement with said power means by pivotal movement of said pivoted plate, a lever pivotally intermittently movable relative to said mechanical transducer, means drivingly interconnecting said lever with said power means for pivotally driving said lever, and means extending from said circuit coil and movable therewith interposed between said lever and said mechanical transducer for transmitting driving force from said lever to said transducer as a function of the intensity of light impinging on said photoelectric cell.

7. In a photographic camera having a film exposing aperture and a diaphragm for controlling the amount of light reaching said aperture, the improvement of means for automatically adjusting said diaphragm in response to the light available comprising: a photoelectric cell, a galvanometer having a movable circuit coil associated therewith movable in response to variations in the electrical output of said cell, said diaphragm comprising a plurality of masking members cooperable to define a diaphragm opening, a positionably variable pivot member, a mechanical transducer pivotally mounted on said pivot member, power means, a pivoted plate interconnected with said mechanical transducer, a pair of rotary members mounted on said pivoted plate and serially drivingly engaging one another and said shaft to rotatably drive said shaft, said rotary members being selectively movable into driving engagement with said power means by pivotal movement of said pivoted plate, a lever pivotally intermittently movable relative to said mechanical transducer, means drivingly interconnecting said lever with said power means for pivotally driving said lever, means for varying the position of said pivot member as a function of the direction of roation of said shaft, and means extending from said circuit coil and movable therewith interposed between said lever and said mechanical transducer for transmitting driving force from said lever to said transducer.

8. In a photographic camera having a film exposing aperture and a diaphragm for controlling the amount of light reaching said aperture, the improvement of means for automatically adjusting said diaphragm in response to the light available comprising: a photoelectric cell, a galvanometer having a rotatable circuit coil associated therewith movable in response to variations in the electrical output of said cell, said diaphragm comprising a plurality of masking members cooperable to define a diaphragm opening, a geared shaft drivingly connected to said masking members, a positionably variable pivot member, a mechanical transducer pivotally mounted on said pivot member, a pivoted plate interconnected with said mechanical transducer, a pair of rotary members mounted on said pivoted plate and serially drivingly engaging one another and said shaft to rotatably drive said shaft, power means, one of said rotary members being selectively movable by pivotal movement of said pivoted member into driving engagement with said power means, an entrapment lever pivotally intermittently movable relative to said mechanical transducer, means drivingly interconnecting said lever with said power means for pivotally driving said lever, an entrapment needle extending from said circuit coil and corotatable therewith interposed between said lever and said mechanical transducer for transmitting driving force from said lever to said transducer, and gear means interconnecting said shaft with said pivot member to vary the position of said piovt member relative to said mechanical transducer as a function of the degree and direction of rotation of said shaft.

9. In a photographic camera having a film exposing aperture and a diaphragm for controlling the amount of light reaching said aperture, the improvement of means for automatically adjusting said diaphragm in response to the light available comprising: a photoelectric cell, a galvanometer having a movable circuit coil associated therewith movable in response to variations in the electrical output of said cell, said diaphragm comprising a plurality of masking members cooperable to define a diaphragm opening, a positionably variable pivot member, a mechanical transducer pivotally mounted on said pivot member, power means, a pivoted plate interconnected with said mechanical transducer, a pair of rotary members mounted on said pivoted plate and serially drivingly engaging one another and said shaft to rotatably drive said shaft, said rotary members being selectively movable into driving engagement with said power means by pivotal movement of said pivoted plate, a lever pivotally intermittently movable relative to said mechanical transducer, means drivingly interconnecting said lever with said power means for pivotally driving said lever, a rotary shutter drivingly connected to said power means operable to successively cover and uncover said film exposing aperture, an entrapment needle extending from said circuit coil and co-rotatable therewith interposed between said lever and said mechanical transducer for transmitting driving force from said lever to said transducer, said lever being so interconnected with said rotary shutter that said lever will engage said needle whenever said shutter has uncovered said film exposing aperture, means for varying the position of said pivot member as a function of the direction of rotation of said shaft, and means extending from said circuit coil and movable therewith interposed between said lever and said mechanical transducer for transmitting driving force from said lever to said transducer.

10. In a photographic camera having a film exposing aperture and a diaphragm for controlling the amount of light reaching said aperture, the improvement of means for automatically adjusting said diaphragm in response to the light available comprising: a photoelectric cell, a galvanometer having a rotatable circuit coil associated therewith movable in response to variations in the electrical output of said cell, said diaphragm comprising a plurality of masking members cooperable to define a diaphragm opening, a geared shaft drivingly connected to said masking members, a positionably variable pivot member, a mechanical transducer pivotally mounted on said pivot member, a pivoted plate interconnected with said mechanical transducer, a pair of rotary members mounted on said pivoted plate and serially drivingly engaging one another and said shaft to rotatably drive said shaft, power means, one of said rotary members being selectively movable by pivotal movement of said pivoted member into driving engagement with said power means, an entrapment lever pivotally intermittently movable relative to said mechanical transducer, means drivingly interconnecting said lever with said power means for pivotally driving said lever, a rotary shutter drivingly connected to said power means operable to successively cover and uncover said film exposing aperture, an entrapment needle extending from said circuit coil and corotatable therewith interposed between said lever and said mechanical transducer for transmitting driving force from said lever to said transducer, said lever being so interconnected with said rotary shutter that said lever will engage said needle whenever said shutter has uncovered said film exposing aperture, and gear means interconnecting said shaft with said pivot member to vary the position of said pivot member relative to said mechanical transducer as a function of the degree and direction of rotation of said shaft.

11. In a photographic camera having a film exposing aperture and a diaphragm for controlling the amount of light reaching said aperture, the improvement of means for automatically adjusting said diaphragm in response to the light available comprising: a photoelectric cell, a galvanometer having a movable circuit coil associated therewith movable in response to variations in the electrical output of said cell, said diaphragm comprising at least one masking member operable to define a diaphragm opening, power means, a shaft drivingly connected to said masking member, a pair of rotary members each connected serially with said shaft to rotatably drive said shaft, means for selectively moving one or the other of said rotary members into driving engagement with said power means, a needle extending from said circuit coil and movable therewith, and means for energizing said last mentioned means as a function of the position of said circuit coil to move one or the other of said rotary members into driving engagement with said power means.

References Cited in the file of this patent

UNITED STATES PATENTS

| | | |
|---|---|---|
| 1,905,251 | Styer | Apr. 25, 1933 |
| 2,421,476 | Belar et al. | June 3, 1947 |
| 2,841,064 | Bagby et al. | July 1, 1958 |
| 2,922,347 | Hahn et al. | Jan. 26, 1960 |
| 2,996,965 | La Rue et al. | Aug. 22, 1961 |